United States Patent Office 3,455,675
Patented July 15, 1969

3,455,675
AMINOPHOSPHONATE HERBICIDES
Riyad Rida Irani, Olivette, Mo., assignor to Monsanto Company, St. Louis, Mo., a corporation of Delaware
No Drawing. Continuation of application Ser. No. 481,940, Aug. 23, 1965. This application June 25, 1968, Ser. No. 742,963
Int. Cl. A01n 9/36; C07f 9/38
U.S. Cl. 71—86     34 Claims

ABSTRACT OF THE DISCLOSURE

Phytotoxic method employing compounds of the formula

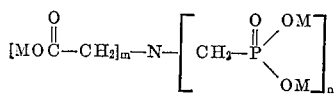

wherein M is selected from the class consisting of alkali metal, hydrogen, alkyl of up to four carbon atoms, ammonium, alkyl substituted ammonium wherein the alkyl moiety has up to four carbon atoms, and wherein $m$ and $n$ are each integers from one to two, provided that the sum of $n$ and $m$ is three.

---

This application is a continuation of application Ser. No. 481,940 filed Aug. 23, 1965, now abandoned.

This invention relates to a novel procedure for inhibiting the growth of unwanted plants. The invention is particularly directed to the use of a class of compounds which have selective phytotoxicity on grasses and other noxious weeds. The procedure is particularly effective in destroying established weeds.

It has been found that a class of compounds not previously known to posses phytotoxic properties are particularly useful as selective toxicants when applied to leaves, stems, roots and other parts of living plants. The useful compounds have the general formula

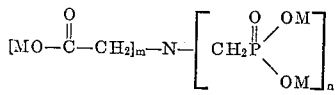

wherein $m$ and $n$ are integers from one to two provided that the sum of $m$ and $n$ is three; and wherein M is selected from the class consisting of alkali metal, hydrogen, alkyl having up to four carbon atoms, ammonium and alkyl substituted ammonium wherein the alkyl moiety has up to four carbon atoms. The useful class of compounds also includes those wherein the several M groups are the same or different. Of particular utility are those compounds wherein some or all of the M substituents are hydrogen, in which case more enhanced activity was observed. The formulation procedure is facilitated if acids, acid salts, or salts are used, because of the ready water dispersibility of the toxicants.

The following compounds have been found to have useful phytotoxicity:

(1) 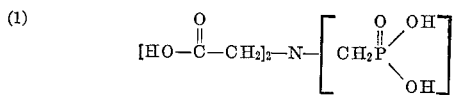

(2) 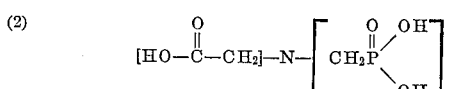

(3) 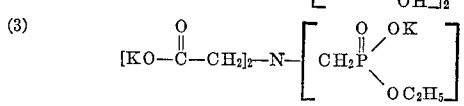

(4) tris(dimethyl ammonium)iminodiacetate N - methyl phosphonate (dimethylamine salt of (1))
(5) trisodium iminodiacetate N - methyl phosphonate (sodium salt of (1))
(6) tetra(dimethyl ammonium)aminoacetate N,N - bis-methyl phosphonate (dimethyl amine salt of (2))

(7) 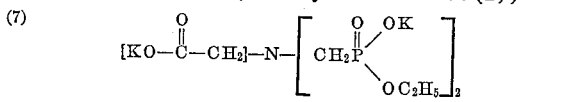

(8) 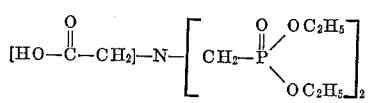

METHOD OF PREPARATION

Example 1

A reaction vessel provided with a stirring mechanism and a reflux condenser was charged with 750 parts by weight of 50% aqueous glycine, 750 parts by weight of 38% orthophosphorous acid, and 500 parts of 38% hydrochloric acid. While stirring the mixture continuously it was heated to 100° C., then 1500 parts of aqueous formaldehyde solution were added gradually over a period of 30 minutes. The reflux condenser was removed and mixture concentrated to evaporate 25% of its volume over a two-hour period. The reaction product was identified as being:

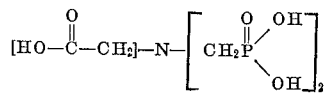

Example 2

A reaction vessel provided with a stirring mechanism and a reflux condenser was charged with 169 parts by weight of amino diacetic acid hydrochloride, 82 parts of orthophosphorous acid, and 50 parts of concentrated hydrochloric acid (38%). The mixture was heated to 100° C. and 200 parts of 37% aqueous formaldehyde were added gradually over a 30-minute period. The resulting solution was maintained at about 100° C. for one hour and 50 parts of p-formaldehyde were then added slowly over a 15 minute period. The resulting product was refluxed for an additional 2 hours. The product was then evaporated in a steam bath to about ⅓ of its volume and dissolved in hot ethanol. A product was precipitated by the addition of hydrochloric acid and was identified as N,N-diacetic acid aminomethylene phosphonic acid having the formula:

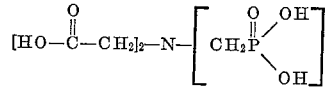

The acids described in the above examples have pronounced phytotoxicity, and derivatives of these acids, such as alkali metal salts, amine and ammonium salts, are also effective. These salts are prepared by neutralizing the acids entirely or in part with suitable alkaline reagents or organic bases.

Although the novel procedure of the present invention encompasses treatment of soil surfaces wherein seeds are germinating and the plants emerging, the compounds are especially useful in destroying or inhibiting the growth of established plants. The surfaces of the soil or of the growing plant parts are sprayed or otherwise treated so as to apply a phytotoxic quantity of the above described active compounds. Compositions suitable for the practice of this invention may be aqueous solutions or dispersions. Generally, concentrations of about 0.01 to about 0.5 percent by weight are suitable for this application. The formulations are applied at rates sufficient to provide a treatment of approximately 0.1 to 10 pounds per acre of the weed infested areas. A convenient means of application of a desired quantity is to dissolve or disperse the active agent, for example 5 pounds in 10 to 200 gallons of water and apply it uniformly over a measured area to provide the phytotoxicity required for the control of the principal weeds.

The contact phytotoxicities of the above described compounds (1–6) were studied on a large variety of plants, each representing an important genus of weeds or crops. These plants are identified in the following tables by letters as follows:

A  Morning glory     E  Barnyard grass
B  Wild oat          F  Crab grass
C  Radish            G  Wild buckwheat
D  Foxtail In the following table the phytotoxicity, determined by counting living and dead plants and estimating the relative degree of efficacy, is indicated by numerals as follows:

0—No phytotoxicity
1—Slight phytotoxicity
2—Moderate phytotoxicity
3—Severe phytotoxicity
4—All plants dead The fractional ratings are the averages of several independent measurements.

The phytotoxicity measurements were made by growing the plants for three weeks and spraying them with the several toxicants at a rate equivalent to 2 pounds per acre. The following table sets forth the observations:

| Compound | Plant species | | | | | | |
|---|---|---|---|---|---|---|---|
| | A | B | C | D | E | F | G |
| 1 | 4 | 3.5 | 2 | 4 |  | 4 | 2.5 |
| 2 | 1.5 | 2.5 | 1.5 | 3 | 1.75 | 3 | 1.5 |
| 3 | 2.8 | 2.85 | 2 | 3 | 2.5 | 3 | 3 |
| 4 | 3 | 3 | 1.5 | 3.5 | 3 | 4 | 1.5 |
| 5 | 3.5 | 3 | 2.5 | 4 | 4 | 4 | 0.5 |
| 6 | 2 | 2 | 2 | 3 | 3 | 3 | 2 |

The compositions of preferred phytotoxicity are solutions, or other liquid dispersions. The choice of a liquid medium will depend to some extent upon the physical properties of the active ingredient. The herbicides may be water-soluble and mere dissolution will then provide a usable formulation. Often the herbicidal compounds are of limited solubility in water, and the aqueous formulations may then be dispersions of minute drops of the water-insoluble substances in an aqueous medium. The water-insoluble products of this invention may first be dissolved in a suitable organic solvent and the organic solution of the active ingredient then incorporated in water or in any aqueous medium to produce a heterogeneous dispersion of the active ingredient in water.

One component which aids in the effectivity of the herbicidal composition is a surface active agent which serves in providing uniform dispersions of all formulation components of both solid and liquid types, and which may be anionic, cationic or non-ionic including conventional soaps, such as the water-soluble salts of long chain carboxylic acids, the amine soaps such as the amine salts of long chain carboxylic acids, the sulfonated animal, vegetable and mineral oils, quaternary salts of high molecular weight acids; resin soaps, such as salts of abietic acid, sulfuric acid salts of high molecular weight organic compounds, algin soaps, ethylene oxide condensated with fatty acid, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefitted by the incorporation of organic solvents for the active components, such as the organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as one percent or as much as 20 percent in order to provide a uniformly distributed formulation which is capable of maintaining its distributed state during storage, use and after application to the plant surfaces.

A useful formulation of the herbicidal compositions may involve the solid or liquid concentrate of the active ingredient to which have been added formulation aids or conditioning agents so that the concentrates may be mixed with a suitable extender or diluent in the field at the time of use. Obviously, for this purpose the dispersing agents will be present in larger concentrations so that upon dilution with water or other liquid, compositions containing optimum proportions of dispersing agents and active component will be prepared. The liquid formulations are preferably applied by mechanical equipment involving spraying or spreading the formulation on the plant surfaces being treated. For this purpose readily flowable compositions are required. Thus, a critical aspect of the invention is the fluent carrier without which the optimum herbicidal effects cannot be achieved.

The compounds being especially useful in contact with the plant tissues, a very active formulation will preferably include adhesives, such as vegetable gums and especially those of limited solubility in water so that the active components will adhere to the surfaces being treated and will resist natural forces such as sunlight, wind and rain which might otherwise remove the herbicide or render it less effective.

The liquid formulations above described are useful in the application of herbicides because they facilitate the uniform distribution and aid in the destruction of undesirable plants by maintaining the active ingredient in a form which enables the prompt assimilation by the plant and the efficient utilization of its weed-destroying properties. The described "conditioning agents" enable the proper use to achieve the desired herbicidal effects by an unskilled operator without elaborate equipment.

In addition to the above described herbicide conditioning agents, other adjuvants may be added, such as insecticides, fungicides, nematocides and other herbicides. By the use of the subject compounds at the low grass specific levels of application, substantial benefits can be obtained by the addition thereto of a broad leaf specific herbicide. In this manner, formulations for efficient and effective use can be provided.

Herbicides useful in combination with the above described iminoacetate-N-methyl phosphonates include 2,4-dichlorophenoxyacetic acids, 2,4,5-trichlorophenoxyacetic acid, 2-methyl-4-chlorophenoxyacetic acid and the salts, esters and amides thereof; the triazine derivatives, such as 2,4-bis(3-methoxypropylamino) - 6 - methylthio-S-triazine; 2-chloro-4-ethylamino - 6 - isopropylamino - S - triazine, and 2-ethylamino-4-isopropylamino-6-methylmercapto-S-triazine; the urea derivatives, such as 3-(3,4-dichlorophenyl)-1,1-dimethyl urea and 3-(p-chlorophenyl)-1,1-dimethyl urea; the acetanilides such as N-isopropyl-α-chloroacetanilide, and N-ethyl-α-chloro-2-methyl acetanilide and 2-t-butyl-2'-chloro-6-methylacetanilide, and the acetamides such as N,N-diallyl-α-chloroacetamide, N-(α-chloroacetyl)hexamethylene imine, and N,N-diethyl-α-bromoacetamide.

Although the invention is described with respect to specific modifications, it is not intended that the details thereof be construed as limitations except to the extent incorporated in the following claims.

The embodiments of the invention in which an exclusive property of privilege is claimed are defined as follows:

1. Method of controlling the growth of plants which comprises contacting the plants with a phytotoxic amount of a compound of the formula

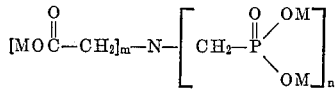

wherein M is selected from the group consisting of alkali metal, hydrogen, alkyl of not more than 4 carbon atoms, ammonium, alkyl substituted ammonium wherein the alkyl is of not more than 4 carbon atoms, and $m$ and $n$ are each integers from one to two, provided that the sum of $m$ and $n$ is three.

2. Method of claim 1 wherein $m$ is two.
3. Method of claim 1 wherein $n$ is two.
4. Method of claim 1 wherein M is hydrogen.
5. Method of claim 1 wherein the plants are contacted prior to emergence from soil by application of the compound to soil.
6. Method of claim 1 wherein the phytotoxic amount is a selective phytotoxic amount.
7. Method of claim 5 wherein M is hydrogen.
8. Method of claim 1 wherein the plants are contacted subsequent to emergence from soil by application of the compound to the plant.
9. Method of claim 8 wherein the plants are contacted with a selective phytotoxic amount.
10. Method of claim 8 wherein M is hydrogen.
11. Method of claim 1 wherein M is alkali metal.
12. Method of claim 1 wherein M is alkyl substituted ammonium.
13. Method of claim 1 wherein the compound is nitrilodi(acetic acid)(methylphosphonic acid).
14. Method of claim 1 wherein the compound is nitrilo(acetic acid)di(methylphosphonic acid).
15. Method of claim 1 wherein the compound is tris(dimethyl ammonium)iminodiacetate N-methyl phosphonate.
16. Method of claim 1 wherein the compound is dipotassium iminodiacetate N-methyl O-potassium O-ethylphosphonate.
17. Method of claim 1 wherein the compound is trisodium iminodiacetate N-methyl phosphonate.
18. Method of claim 1 wherein the compound is tetra(dimethyl ammonium)aminoacetate N,N - bis - methylphosphonate.
19. Method of claim 9 wherein the compound is nitrilodi(acetic acid) (methylphosphonic acid).
20. Method of claim 9 wherein the compound is nitrilo(acetic acid) di(methylphosphonic acid).
21. Method of claim 9 wherein the compound is tris(dimethyl ammonium)iminodiacetate N-methyl phosphonate.
22. Method of claim 9 wherein the compound is dipotassium iminodiacetate N-methyl O-potassium O-ethylphosphonate.
23. Method of claim 9 wherein the compound is trisodium iminodiacetate N-methyl phosphonate.
24. Method of claim 9 wherein the compound is tetra(dimethyl ammonium)aminoacetate N,N-bis-methylphosphonate.
25. Method of claim 1 wherein the plants are contacted with a composition comprising said compound, a conditioning agent and a surface active agent.
26. Method of claim 25 wherein the plants are contacted subsequent to emergence from soil by application of the composition to the plants.
27. Method of claim 25 wherein the plants are contacted with a selective phytotoxic amount.
28. Method of claim 25 wherein the surface active agent is a non-ionic surface active agent.
29. Method of claim 25 wherein M is hydrogen.
30. Method of claim 25 wherein M is an alkali metal.
31. Method of claim 25 wherein the compound is nitrilodi(acetic acid) (methylphosphonic acid).
32. Method of claim 25 wherein the compound is nitrilo(acetic acid)di(methylphosphonic acid).
33. Method of claim 25 wherein the compound is tris(dimethyl ammonium)iminodiacetate N-methyl phosphonate.
34. Method of claim 25 wherein the compound is dipotassium iminodiacetate N-methyl O-potassium O-ethylphosphonate.

References Cited

UNITED STATES PATENTS

| | | | |
|---|---|---|---|
| 2,959,590 | 11/1960 | Moss | 71—86 |
| 3,234,140 | 2/1966 | Irani | 260—502.5 |
| 3,288,846 | 11/1966 | Irani et al. | 260—502.5 |

FOREIGN PATENTS 578,105  6/1959  Canada.

OTHER REFERENCES

Ryzhkov et al., "Biological Activity etc." (1954), CA 49, pp. 3403–04 (1955).

Schwarzenbach et al., "Complex Ions etc." (1949), CA 44, pp. 547–48 (1950).

Kabachnik et al., "Synthesis and Evaluation, etc." (1960) CA 54, pp. 223–29 (1960).

LEWIS GOTTS, Primary Examiner

G. HOLLRAH, Assistant Examiner

U.S. Cl. X.R.
260—502.5, 945

UNITED STATES PATENT AND TRADEMARK OFFICE
CERTIFICATE OF CORRECTION

PATENT NO. : 3,455,675
DATED : July 15, 1969
INVENTOR(S) : Riyad R. Irani

It is certified that error appears in the above-identified patent and that said Letters Patent is hereby corrected as shown below:

Column 2, line 20: "750" should read --820--

Column 2, line 21: delete "38%", first occurrence

Column 2, line 24: after "solution" insert --(37%)--

Signed and Sealed this

Sixteenth Day of April 1985

[SEAL]

Attest:

DONALD J. QUIGG

Attesting Officer     Acting Commissioner of Patents and Trademarks